May 16, 1950          J. H. MILLER          2,507,803
MULTIPLE TESTER WITH CORNER TRANSFORMER
Filed Aug. 19, 1946
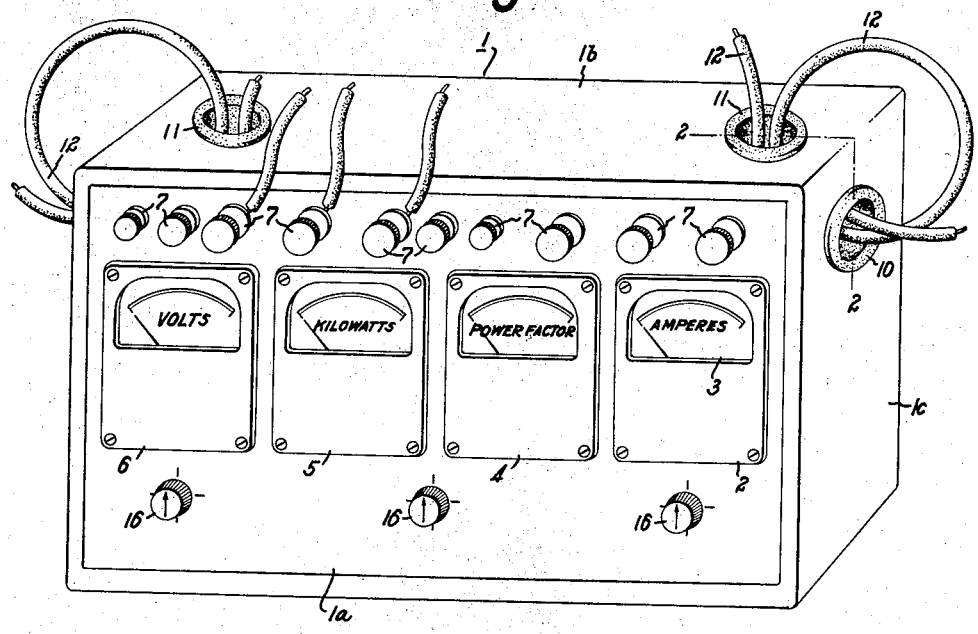
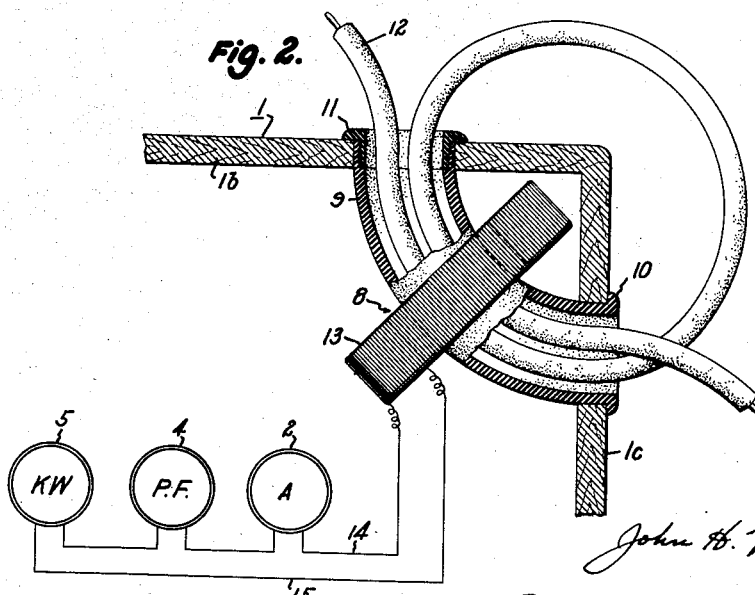

Patented May 16, 1950

2,507,803

UNITED STATES PATENT OFFICE 2,507,803

MULTIPLE TESTER WITH CORNER TRANSFORMER

John H. Miller, Short Hills, N. J., assignor to Weston Electrical Instrument Corporation, Newark, N. J., a corporation of New Jersey Application August 19, 1946, Serial No. 691,623

1 Claim. (Cl. 171—95)

This invention relates to electrical measuring instruments and in particular to those of the portable type including a plurality of instruments for the measurement of such factors as wattage, voltage, current and power factor and which are known as industrial analyzers.

Instruments of this type are built as self-contained units and the particular problem has been the provision of convenient means for the measurement of alternating current in the high ranges encountered in industry. Current values up to approximately 150 amperes can readily be measured by providing a direct connection to the measuring system through heavy, metal binding posts located on the exterior of the casing. For the measurement of high currents it is necessary to employ separate current transformers which are supplied as accessory equipment or can be built within the confines of the casing. In the latter case, the prior art transformers comprised a bushed opening through the industrial analyzer casing between the front and back walls and a secondary winding surrounding the bushing within the casing. The secondary winding is connected to the ammeter and the current to be measured is carried by a cable passing through the bushed opening; the cable forming the primary of the transformer.

This arrangement has not proven to be entirely satisfactory from the user's point of view. The primary conductor passing through the front face of the casing from which the current indicating and other meters are read has proven particularly bothersome to the operator for it often gets in his way when operating the range switches and other associated device which may be included with the analyzer. Also, with the heavy conductor extending from the back wall of the casing, the analyzer no longer rests firmly upon the supporting surface. Further, in the prior constructions the space requirement of the separate transformer precludes the close grouping of the various electrical instruments, resistors and other components thereby necessitating the use of a rather large casing. This is particularly true in polyphase analyzers employing two separate transformers.

The object of this invention is to provide an improved construction for an instrument of the class described in which the ammeter and transformer components are arranged within the enclosing casing in a new and improved way that makes the instrument considerably more convenient to use than are those that are now available. A more specific object is to provide an instrument of the class described in which the primary cable is passed through a side corner of the enclosing casing which thereby permits the instrument casing to be laid face-up on a table when in use and also removes the cable completely out of the way of the operator. These and other objects and advantages of the invention will become more apparent from the detailed description to follow and from the accompanying drawings.

In the drawings which show a preferred construction, Fig. 1 is a view in perspective of the improved casing of a polyphase analyzer provided at each upper corner with a current transformer embodying the invention, while Fig. 2 is a horizontal view taken along the lines 2—2 of Fig. 1, partly in plan and partly in section showing the bushing for the primary conductor and the secondary coil of the transformer, the connections between the secondary, the current indicator device and other electrical measuring instruments which depend upon the current being shown schematically.

Referring now to the drawings, the self contained analyzer instrument is comprised of a casing 1 which may be of rectangular shape made from any suitable material such as wood. The current indicating device is comprised of an ampere meter 2 of known construction which is supported within the casing 1 so that its scale plate 3 is substantially flush with the front face or wall 1a of the casing. Other measuring instruments such as a power factor meter 4, a kilowatt meter 5 and a voltmeter 6 are arranged in line on the front panel 1a beside the ampere meter 2. Binding posts designated generally by reference numeral 7 are arranged on the front face 1a for circuit connections to the various instruments in the analyzer and some of these are used as previously explained when measuring currents in the lower ranges. For measuring currents of higher magnitudes, a current transformer 8 is used. As shown in Fig. 2, transformer 8 is preferably built into a corner of casing 1 and is comprised of a bushing 9 preferably of insulating material such as Bakelite in the form of a 90° elbow which extends between adjoining casing side walls 1b and 1c. Bushing 9 may be provided with a flanged collar 10 at one end and a removable collar 11 at the other end which is threaded on to this end of the bushing to secure it in place after it has been inserted through the corner of the casing. Two current transformers are shown in Fig. 1, since, as is well known in the art, two identical current transformers are employed in making two or three phase power (watts) and power factor measurements.

The magnitude of the current flowing in a conductor is measured by passing the conductor through the bushing 9. This conductor indicated on the drawings by reference numeral 12 may be looped into one or more turns and constitutes the primary winding of the current transformer 8. The secondary winding in the transformer is comprised of a toroidal coil 13 surrounding the bushing 9. Its terminal ends are connected in any suitable manner such as by conductors 14, 15 to the ammeter 2, power factor meter 4 and kilowatt meter 5, all of which are arranged electrically in series.

The advantages of this new transformer arrangement should now be obvious. By arranging the bushing 9 across a corner of the casing 1 between adjoining side walls 1b and 1c, the primary conductor 12 is now no longer in the way of the user and the front face 1a of the casing is left free of all obstructions. This makes it much easier to obtain an accurate reading of the various meters and operate the switches 16, and furthermore facilitates the making of connections to the binding posts 7.

The new construction is also superior to prior known arrangements in that with the secondary coil of the transformer now located in the corner of the casing, a space which had heretofore been of little or no use, the remainder of the component parts of the instrument may be more advantageously grouped in a smaller space than has heretofore been possible which results in a casing having comparatively small dimensions.

In conclusion, it will be understood while the illustrated embodiment is to be preferred, various changes in the details of construction may be made without departing from the spirit and scope of the invention as defined in the appended claim.

I claim:

In a casing having front and rear walls and a plurality of side walls therebetween adapted to house a plurality of electrical measuring instruments constituting an industrial analyzer, all of said instruments being readable from the front wall of the casing, an arcuate bushing extending through a corner portion of said casing defined by the juncture of two of said side walls with the bushing axis parallel to the plane of said front wall, said bushing being adapted to have a line conductor looped therethrough constituting the primary of a current transformer, and a secondary transformer winding surrounding said bushing within said casing and adapted to be connected to at least one of said instruments.

JOHN H. MILLER.

REFERENCES CITED

The following references are of record in the file of this patent:

UNITED STATES PATENTS

| Number | Name | Date |
|---|---|---|
| 2,146,555 | Arey | Feb. 7, 1939 |
| 2,266,624 | Hall | Dec. 16, 1941 |
| 2,295,959 | Melville et al. | Sept. 15, 1942 |

OTHER REFERENCES

Electrical Measurement Instruments, Jewel Instrument Co., Chicago, Catalog No. 17, Copyright 1930.